(12) United States Patent
Bolshtyansky et al.

(10) Patent No.: US 6,882,664 B2
(45) Date of Patent: Apr. 19, 2005

(54) LASER WITH INTERNALLY COUPLED PUMP SOURCE

(75) Inventors: Maxim A. Bolshtyansky, Bound Brook, NJ (US); Paul F. Wysocki, Flemington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/084,908

(22) Filed: Feb. 28, 2002

(65) Prior Publication Data

US 2003/0161357 A1 Aug. 28, 2003

(51) Int. Cl.[7] .................................. H01S 3/30
(52) U.S. Cl. .................................. 372/6; 372/9
(58) Field of Search ............... 372/6, 9, 29.022, 372/72, 97, 99, 102, 31, 23, 68, 96, 92, 32, 41, 75

(56) References Cited

U.S. PATENT DOCUMENTS

| | | | |
|---|---|---|---|
| 4,815,079 A | | 3/1989 | Snitzer et al. |
| 4,818,062 A | | 4/1989 | Scifres et al. |
| 5,127,068 A | | 6/1992 | Baer et al. |
| 5,268,978 A | | 12/1993 | Po et al. |
| 5,410,626 A | * | 4/1995 | Okuta et al. .................... 385/43 |
| 5,511,083 A | * | 4/1996 | D'Amato et al. ............... 372/6 |
| 5,530,709 A | * | 6/1996 | Waarts et al. .................... 372/6 |
| 5,564,832 A | * | 10/1996 | Ball et al. ........................ 374/161 |
| 5,594,747 A | * | 1/1997 | Ball .............................. 372/31 |
| 5,864,644 A | * | 1/1999 | DiGiovanni et al. ........... 385/43 |
| 5,966,491 A | * | 10/1999 | DiGiovanni ................. 385/127 |
| 6,061,369 A | * | 5/2000 | Conradi ......................... 372/6 |
| 6,134,362 A | * | 10/2000 | Au-Yeung et al. ............. 385/43 |
| 6,163,554 A | * | 12/2000 | Chang et al. ................... 372/6 |
| 6,167,075 A | * | 12/2000 | Craig et al. ................... 372/75 |
| 6,212,310 B1 | * | 4/2001 | Waarts et al. ................. 385/24 |
| 6,342,961 B1 | * | 1/2002 | Bergano et al. ............. 359/124 |
| 6,363,088 B1 | * | 3/2002 | Alphonse et al. ............... 372/6 |
| 6,370,180 B1 | * | 4/2002 | Zenteno ....................... 372/96 |
| 6,406,197 B1 | * | 6/2002 | Okuda et al. .................. 385/96 |
| 6,434,302 B1 | * | 8/2002 | Fidric et al. .................. 385/43 |
| 6,456,637 B1 | * | 9/2002 | Holcomb et al. ............. 372/40 |
| 6,483,973 B1 | * | 11/2002 | Mazzarese et al. ......... 385/123 |

OTHER PUBLICATIONS

J. Hecht, "Dispersion Control Boosts High–Speed Transmission," Laser Focus World, pp. 107–113, Jul. 2000.

* cited by examiner

*Primary Examiner*—Minsun Oh Harvey
*Assistant Examiner*—Tuan N. Nguyen

(57) ABSTRACT

Methods and apparatus for coupling of pump light inside a laser cavity of a fiber laser. The optical elements of the cladding pumped laser are configured such that the pump laser is coupled within the laser cavity. An optical fiber laser includes a laser cavity comprising a lasing medium and first and second reflector devices, a pump source, and a combiner. The combiner has a first side, a second side and an input port that may be associated with one of the first and second sides. An output of the pump source is operatively coupled to the input port of the combiner, and the combiner is coupled at its first and second sides within the laser cavity.

11 Claims, 5 Drawing Sheets

FIG. 1B  FIG. 1C  FIG. 1D

LASER WITH INTERNALLY COUPLED PUMP SOURCE

FIELD OF THE INVENTION

The present invention relates generally to lasers, and more particularly to techniques for combining single-mode laser light with multi-mode pump light inside a laser cavity.

BACKGROUND OF THE INVENTION

Cladding-pumped fiber laser devices are important in a wide variety of optical applications. For example, in optical communications, cladding-pumped lasers are used as an input optical source for high power Erbium/Ytterbium (Er/Yb) amplifiers, remotely located Erbium (Er) amplifiers in repeaterless communications systems, as well as Raman lasers. In addition, cladding pumped fiber laser devices have promising applications as light sources for printers, in medical optics, and in material processing and manufacturing.

A typical cladding pumped fiber comprises a single-mode core and inner and outer cladding layers. The inner cladding layer surrounding the core is typically a silica cladding having a relatively large cross-sectional area (as compared to the core) and a relatively high numerical aperture. It is usually non-circular (rectangular or star-shaped) to ensure that the modes of the inner cladding may overlap with the core. The outer cladding is commonly composed of a relatively low refractive index polymer. The index of the core is greater than that of the inner cladding, which, in turn, is greater than that of the outer cladding.

A major advantage of the cladding pumped fiber is that it is able to convert light from a relatively low-brightness source into light of a relatively high brightness in a single-mode fiber. Light from low-brightness sources such as diode arrays may be coupled into the inner cladding due to its relatively large cross-sectional area and relatively high numerical aperture. In a cladding pumped fiber laser, the core is doped with a rare earth metal such as Er. The light in the inner cladding interacts with the core and is absorbed by the rare earth dopant. Therefore, if optical feedback is provided (e.g., as by employing a Bragg grating optical cavity), the cladding pumped fiber will act as a laser oscillator at the feedback wavelength.

One difficulty preventing the further exploitation of cladding pumped fiber devices is efficiently coupling a sufficient number of low-brightness source(s) into the inner cladding. A common approach is to couple the light from broad-stripe semiconductor lasers into multi-mode fibers, bundle the fibers, and then to use bulk optics to couple the light from the bundle into the cladding pumped fiber. See, for example, U.S. Pat. No. 5,268,978. The difficulty with this approach, however, is that it requires a number of fine interfaces with associated problems of matching and alignment, as well as two sets of fiber optics. An astigmatic lens is typically disposed between the semiconductor lasers and the bundling fibers and between the bundling fibers and the fiber laser. Polishing, antireflection coatings and maintenance of precise alignments are also required.

Another difficulty preventing the further exploitation of cladding pumped fiber lasers is in coupling multi-mode pump light into the inner cladding while simultaneously coupling single-mode light out of or into the single-mode core. Various solutions have been proposed to overcome this limitation. See, for example, U.S. Pat. No. 4,815,079. One known solution proposes an optical fiber laser in which radiation is pumped into a single-mode core of a laser cavity via a double clad fiber coupling arrangement. A first multi-mode layer surrounds a single-mode core, and it, in turn, is surrounded by a second outermost layer. The multi-mode layer is a core with respect to the outermost layer, which serves as a cladding. At the same time, the multi-mode layer is a cladding with respect to the single-mode core. Pump light coupled into the first multi-mode cladding, either through its end facet or its side, propagates along its length, undergoing a multiplicity of reflections at its core-cladding interface, while intersecting and being absorbed by the innermost core to cause lasing action. In one type of fiber laser, the multi-mode cladding takes the form of a rectangular slab that extends along the laser length.

Fiber lasers are usually made fairly long, on the order of thirty meters or so, with small cross-sectional geometries to make them easy to coil into compact configurations and prevent concentration quenching. However, these qualities, while advantageous for a variety of reasons, make it extremely difficult to efficiently couple high pump power into them to promote lasing. Those skilled in the art have addressed the foregoing problem with more or less success in a variety of ways.

Various solutions have been proposed to overcome the foregoing problem. See, for example, U.S. Pat. Nos. 4,818,062 and 5,127,068. In one known solution, a fiber laser is employed with a bundle of waveguides that receive light from a set of diode laser elements and couple their outputs into a solid state laser medium through a lens. While such an arrangement is adequate for solid state lasers having entrance facets with dimensions of several millimeters, it is more difficult to achieve efficient coupling of high power from the waveguide bundle into the much smaller entrance ends of long, thin, low loss, single-mode fiber lasers with multi-mode claddings. Another disadvantage of this arrangement lies in the difficulty one encounters in matching the lateral and transverse numerical apertures of the waveguides with the lateral and transverse divergences of the laser elements.

In another solution, a cylindrical microlens is employed for collimating the high numerical aperture (NA) output emissions of laser diode arrays so that such emissions may be coupled into an optical fiber. The microlens has a diameter roughly equal to the diameter of the fibers and 20% to 50% bigger than the lateral dimension of the laser diode array. An elliptical or hyperbolic cross-sectional shape may prove useful for correction of particular spherical aberrations. Such an arrangement requires a precisely small spacing from the microlens to the optical fibers, creating a crowded condition in which unintended contact and damage to the microlens or fibers may occur. Moreover, positional and alignment errors may prevent matching of the numerical apertures of the fibers with the divergences of the laser diodes, thus tending to reduce coupling efficiency.

In known laser arrangements, the pump is coupled to the laser outside of the laser cavity. Accordingly, the typical configuration of a known laser includes a pump combiner connected to a first grating, which is connected via a length of fiber to a second grating, wherein the gratings define the outer boundaries of the laser cavity. See, for example, U.S. Pat. No. 5,268,978. Additionally, the gratings that are utilized with such prior art laser configurations typically require a relatively low index coating to support both multi-mode pumping and single-mode signal light.

It is apparent that a need exists for an improved coupling system for pumping a solid state medium of a fiber laser cavity, which avoids the cost, complexity and other problems associated with the conventional approaches. For example, there is a need for a new robust and compact arrangement for coupling the output of low-brightness sources into cladding pumped fibers. In addition, there is a need for an efficient means of simultaneously coupling multi-mode pump light into the inner cladding of a cladding pumped fiber while coupling single-mode light into or out of the core.

SUMMARY OF THE INVENTION

The present invention provides an improved pump coupling configuration particularly well-suited for a cladding pumped laser, though other applications will be apparent to skilled artisans upon reviewing the instant disclosure.

In accordance with one aspect of the present invention, techniques are provided to combine single-mode laser light with multi-mode pump light inside a laser cavity. A cladding pumped laser, in one embodiment of the present invention, is configured such that the pump combiner is coupled within the laser cavity. Advantageously, the configuration of the laser may provide flexibility to utilize standard gratings to define the laser cavity, instead of gratings which require a relatively low index coating to support both multi-mode pump light and single-mode signal light.

In accordance with another aspect of the invention, an optical fiber laser includes a laser cavity comprising a lasing medium and first and second reflector devices, a pump source, and a combiner. The combiner has a first side, a second side and an input port that may be associated with one of the first and second sides. An output of the pump source is operatively coupled to the input port of the combiner, and the combiner is coupled at its first and second sides within the laser cavity.

In accordance with a further aspect of the invention, a method for combining single-mode laser light with multi-mode pump light in an optical fiber laser is provided. The method includes the steps of positioning a pump combiner within a laser cavity comprising first and second reflector devices coupled to respective first and second ends of a lasing medium, and coupling a pump source for exciting the lasing medium to an input of the combiner.

These and other features and advantages of the present invention will become more apparent from the accompanying drawings and the following detailed description.

BRIEF DESCRIPTION OF THE DRAWINGS

The present invention will be better understood from reading the following description of non-limiting embodiments, with reference to the attached drawings, wherein below:

FIGS. 1A–1D schematically illustrate an arrangement using a tapered bundle of multi-mode fibers for pumping a cladding pumped fiber;

DETAILED DESCRIPTION OF THE INVENTION

A cladding pumped laser in accordance with an illustrative embodiment of the present invention utilizes a unique ordering of optical elements. That is, whereas the known solutions couple a pump combiner to the laser outside of the laser cavity, the present invention couples the pump combiner within the laser cavity. Advantageously, the configuration of the laser of the present invention may provide the user with the flexibility to utilize standard gratings to define the laser cavity, instead of gratings which require a relatively low index coating to support both multi-mode pump light and single-mode signal light. This configuration allows one to construct bidirectionally pumped cladding pumped fiber lasers. Thus, pump light may be injected into the inner cladding of both ends of the cladding pumped fiber while the single-mode fiber laser output may be extracted from the core.

Although the present invention is illustrated below in conjunction with particular exemplary laser assemblies, it should be understood that the invention is not limited to use with any particular type of optical fiber laser, but is instead more generally applicable to any fiber laser which requires coupling of light from a pump source. Other applications and realizations will become apparent to skilled artisans upon reviewing the instant disclosure.

Figure 1A:
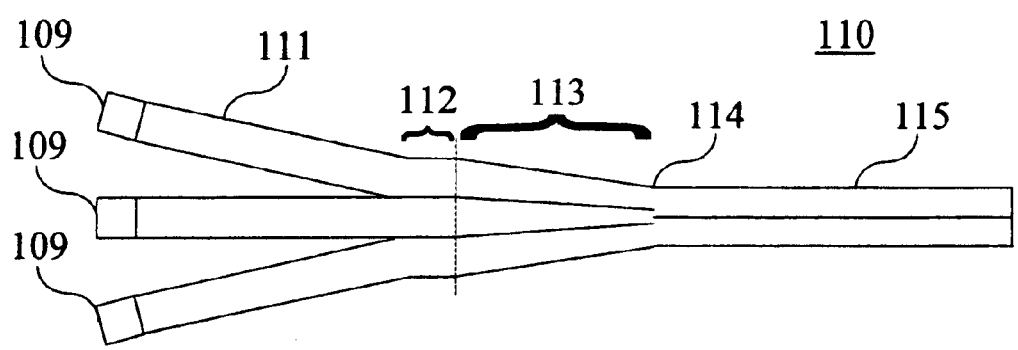
Figure 1A:
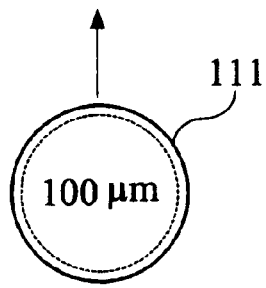
Figure 1A:
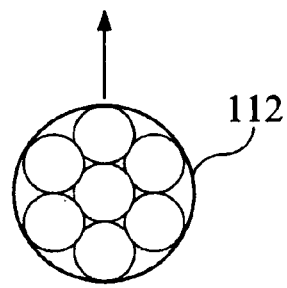
Figure 1A:
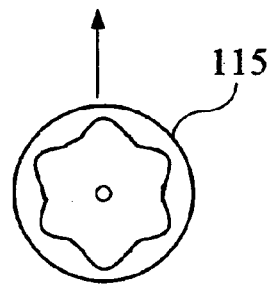

Referring now to the drawings in detail, and initially to FIGS. 1A–1D, an arrangement 110 for pumping a cladding pumped fiber comprising a plurality of individual multi-mode fibers 111 (see FIG. 1B) which converge to a bundled region 112 is illustrated. The bundled region 112 extends to a tapered region 113. The tapered region 113 tapers to a minimum diameter at point 114, closely approximating the diameter of the cladding pumped fiber 115 (see FIG. 1D). Preferably the fibers in the bundled region 112 are arranged in a close-packed formation wherein the interior fibers contact the maximum number of neighboring fibers (see FIG. 1C). Ideally the bundle tapers to a cross-section approximating the inner cladding of the fiber 115. It is contemplated that each individual multi-mode fiber 111 (of which only three are shown in FIG. 1A) will couple light from an associated semiconductor source 109 to the cladding fiber 115.

Figure 2:
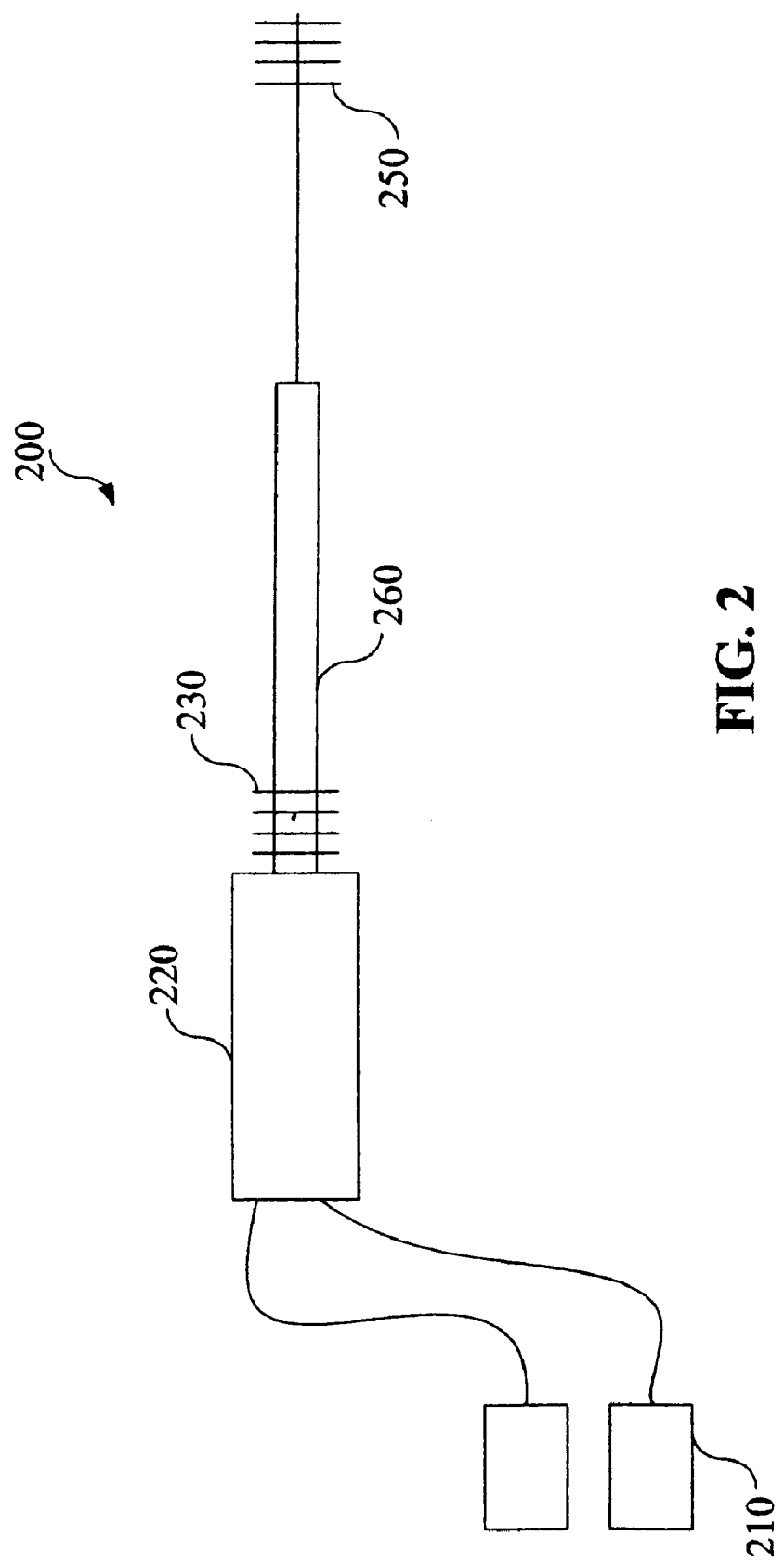
FIG. 2 illustrates a laser assembly configuration without an internally-coupled pump source.

Referring now to FIG. 2, a typical laser assembly 200 is illustrated. Laser assembly 200 is configured having multiple multi-mode pump sources 210 connected to corresponding inputs of a beam combiner 220. Although two multi-mode pump sources 210 are illustrated, it is contemplated that more or less pump sources may be employed. A first grating 230 is coupled to an output of the combiner 220, and a lasing medium 260 is coupled between the first grating 230 and a second grating 250.

A laser cavity is that portion of the laser which concentrates the light to stimulate the emission of radiation. The laser cavity may also be referred to as the optical cavity or resonator. The laser cavity is typically defined by reflector devices (e.g., gratings or mirrors) that reflect light back and forth through a lasing medium on opposite ends of the lasing medium. Typically, one reflector device lets some light escape to form a laser output signal. The laser cavity in FIG. 2 comprises the two gratings 230 and 250 and the lasing medium 260. Thus, the pump source 210 and beam combiner 220 are physically located, and are coupled to the laser assembly, outside of the laser cavity. Additionally, in the known cladding pumped fiber laser assemblies, to avoid multi-mode pump light losses, a relatively low index coating is applied to fiber grating 230.

Figure 3:
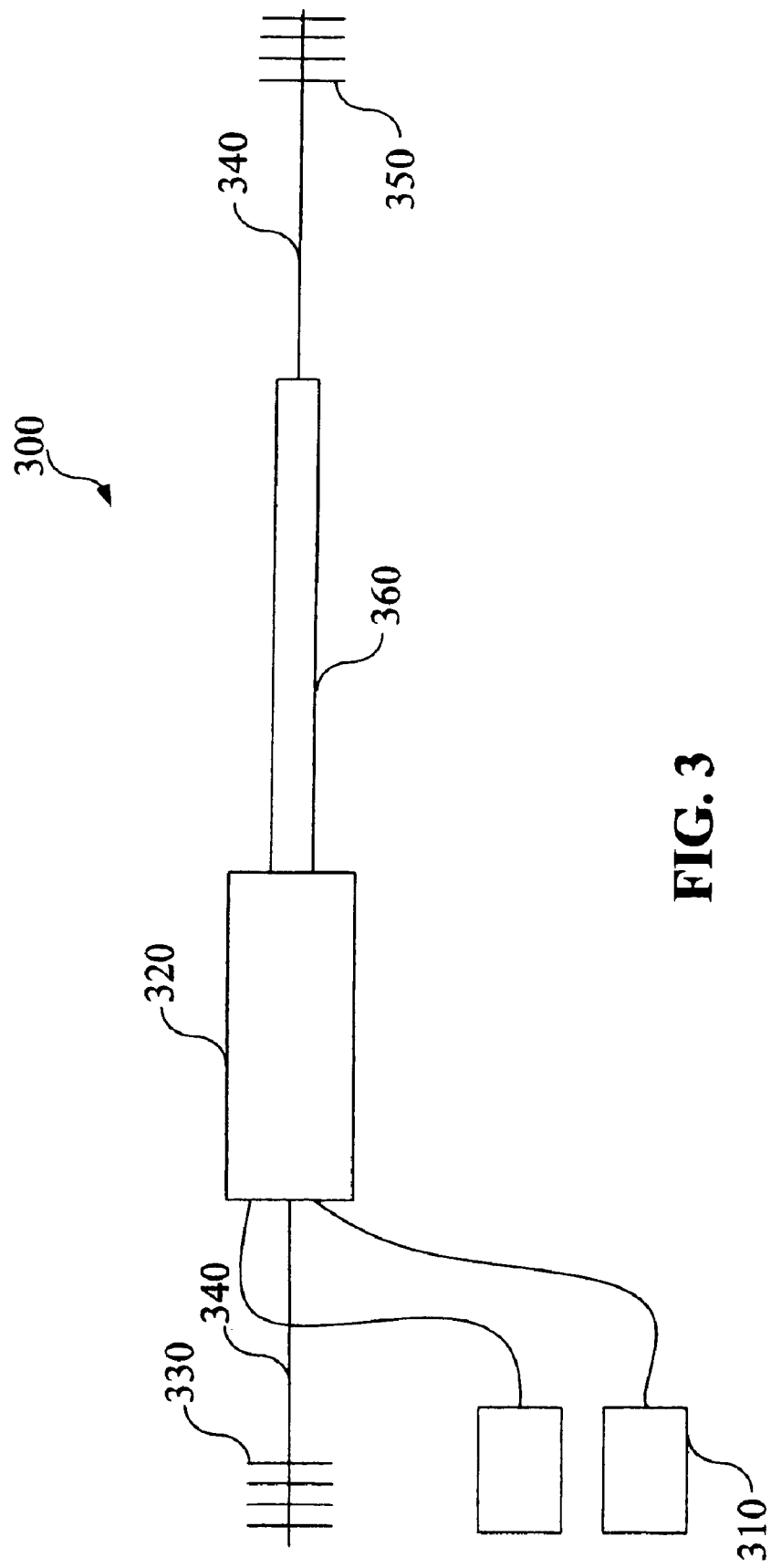
FIG. 3 illustrates a laser assembly configuration with an internally-coupled pump source in accordance with the present invention.

FIG. 3 illustrates a laser assembly 300 in accordance with the present invention. Laser assembly 300 is configured having a first reflector device 330 connected via a lasing medium 340 to a first end of a multi-mode beam combiner 320. Two multiple multi-mode pump sources 310 are also connected to the first end of the multi-mode beam combiner 320. It is contemplated that the multi-mode pump sources 310 may be broadband laser diodes, or other suitable pump sources. A single-mode lasing medium 360 is connected on a first end thereof to a second end of the combiner 320. A second reflector device 350 is connected to a second end of the single-mode lasing medium 360. The laser cavity in FIG. 3 comprises the two reflector devices 330 and 350 and the lasing medium 340 and 360. Thus, the pump sources 310 and beam combiner 320 are physically coupled to the laser assembly within the laser cavity.

The reflector devices 330 and 350 are preferably fiber Bragg gratings. Advantageously, due to the configuration of the elements of the laser assembly, such gratings when utilized as reflector devices 330 and 350 do not require a relatively low index coating as in the prior art. Rather, standard gratings may be utilized. The gratings may alternatively have a high index coating formed thereon. It is also contemplated that the reflector devices can be implemented as dielectric film mirrors, interference filters, broad metal mirrors (one side only) or polished fiber ends (typically creates a four percent reflector). Lasing medium 360 is preferably a cladding pumped fiber with a rare earth doped core.

It is further contemplated that the beam combiner 320 may be a tapered fiber bundle, as shown in FIG. 1A, with a single-mode fiber through the center of the tapered fiber bundle. The use of a tapered fiber bundle in a cladding pumped laser has numerous advantages over conventional bundling and bulk optics. For example, no polishing or antireflection coating is required, there is no alignment of bulk optical system to be maintained, and losses are lower. In addition, as the fiber bundle is heated during the tapering process, surface tension forms the bundle into one fiber, circular or nearly circular in cross-section, thereby eliminating any wasted interstitial space.

Figure 4:
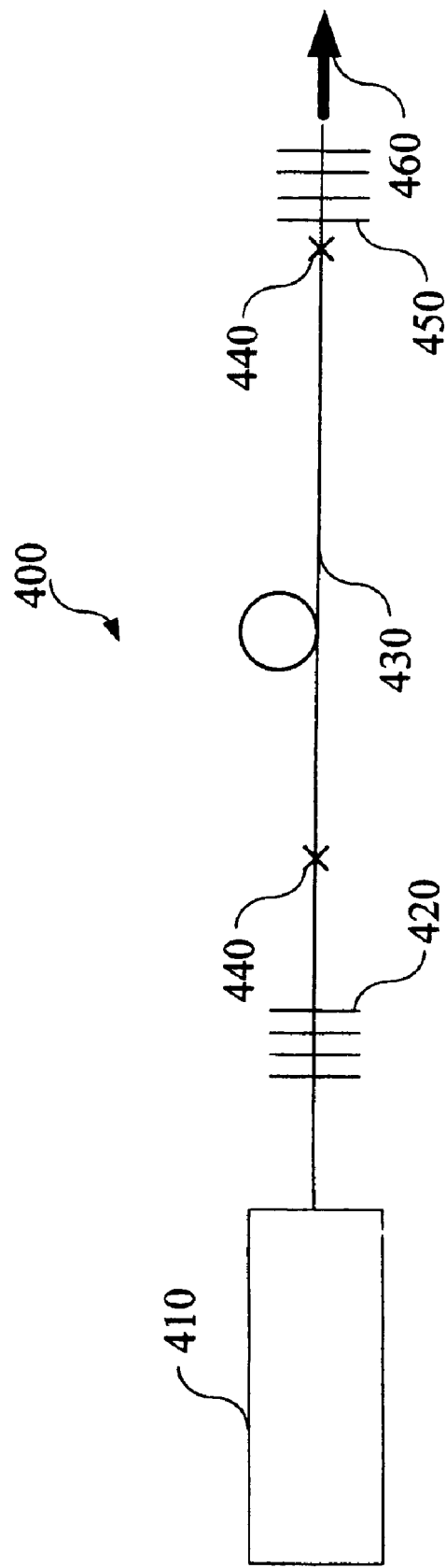
FIG. 4 illustrates a single-mode fiber laser with a pump outside of the laser cavity in accordance with the prior art.

FIG. 4 illustrates a single-mode fiber laser 400 with a pump source coupled outside of the laser cavity. The single-mode fiber laser includes a single-mode pump source 410 coupled outside of the laser cavity and coupled to a reflector device 420. The reflector device 420 may be, for example, a fiber Bragg grating. The reflector device 420 is coupled to a second reflector device 450 via a single-mode lasing medium 430. The laser cavity in FIG. 4 comprises the two reflector devices 420 and 450 and the lasing medium 430. Thus, the pump source 410 is physically coupled outside of the laser cavity. The two X marks referred to by reference numeral 440 indicate locations at which two sections of the lasing medium 430 may have been spliced. Although splices are typically present, and sometimes necessary, in many cases the splices can be eliminated by design and one continuous fiber may be used instead. The lasing medium shown in FIG. 4 is preferably a single-mode fiber with standard high index coatings. The direction of the laser output is indicated by the arrow having reference numeral 460.

Figure 5:
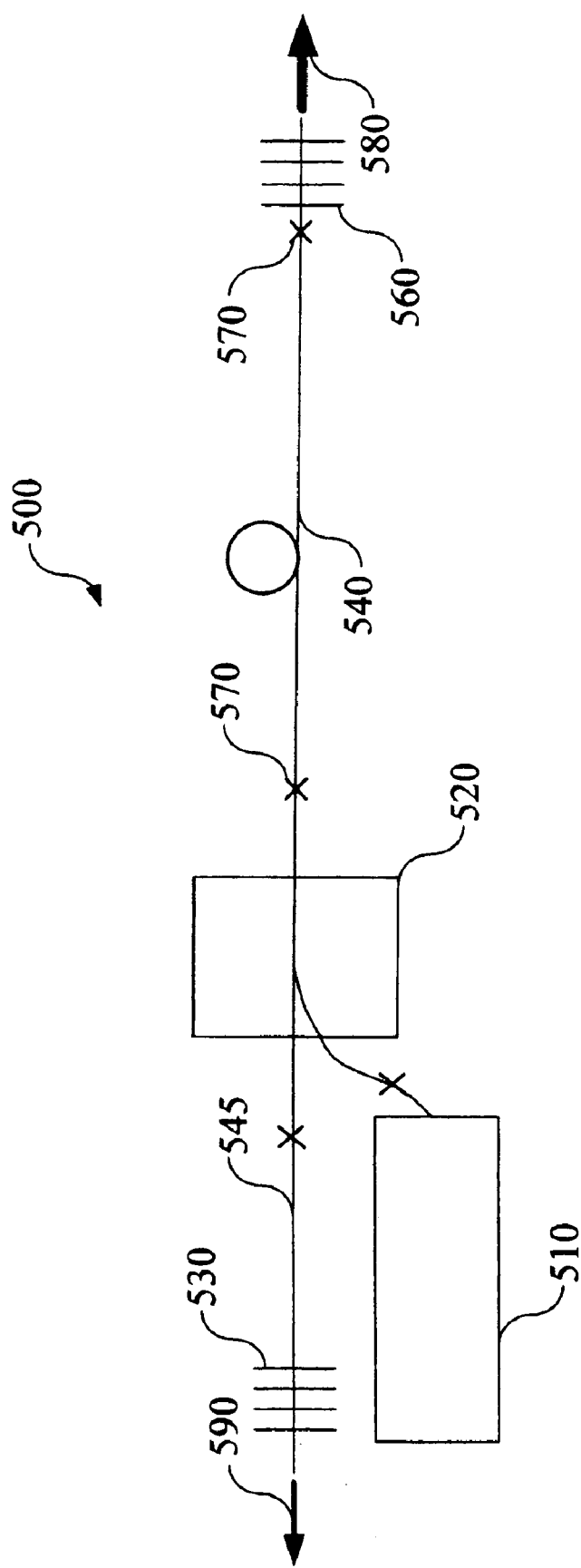
FIG. 5 illustrates a single-mode fiber laser with a pump coupler positioned inside of the laser cavity.

FIG. 5 illustrates a single-mode fiber laser 500 with a pump combiner positioned inside of the laser cavity. A single-mode pump source 510 is coupled to an input port of combiner 520 which is positioned inside of the laser cavity. The combiner 520 is preferably a wavelength division multiplexing (WDM) coupler. The laser cavity in FIG. 5 comprises two reflective devices 530 and 560 and the lasing medium 540 and 545. Thus, the combiner 520 is physically coupled at first and second sides thereof within the laser cavity. It is contemplated that the input port may be associated with either one of the first and second sides, or any other side, of combiner 520. Reflective devices 530 and 560 are preferably fiber Bragg gratings. It is also contemplated that the reflective devices can be implemented as dielectric film mirrors, interference filters, broad metal mirrors (one side only) or polished fiber ends (typically creates a four percent reflector). The reflective devices 530 and 560 are connected by a single-mode fiber 540 which includes splices 570. That is, the X marks referred to by reference numeral 570 indicate locations at which two sections of the lasing medium 540 have been spliced. Although splices are typically present, and sometimes necessary, in many cases the splices can be eliminated by design and one continuous fiber may be used instead. Unlike typical end coupled lasers, the laser output in the illustrative embodiment of FIG. 5 can come out of either end in the directions indicated by arrows 580 and 590. The single-mode fiber 540 is preferably coated with a standard high index coating. Additionally, the pump source 510 is not limited to a particular type of pump source and may include pump sources such as, for example, a semiconductor laser pump and a fiber laser pump.

The combiners are illustrated in FIGS. 3 and 5 coupled toward one end of the laser cavity. It is contemplated that the combiner may be coupled at any one of various positions within the laser cavity. Furthermore, in the case of a bidirectionally pumped fiber laser, two combiners may be coupled within the laser cavity with one on each end.

It should be emphasized that the exemplary devices and techniques described herein are intended to illustrate the operation of the invention, and therefore should not be construed as limiting the invention to any particular embodiment or group of embodiments. For example, although the laser assemblies are illustrated herein using gratings, alternative embodiments of the invention can use other types of reflective devices such as, for example, mirrors. Furthermore, as indicated above, the invention can be used to implement bidirectionally pumped fiber lasers. Additionally, the invention is not limited in application to cladding pumped lasers, but is more broadly applicable to other types of fiber lasers. These and numerous other alternative embodiments within the scope of the following claims will therefore be apparent to those skilled in the art.

We claim:

1. An optical fiber laser comprising:
    a laser cavity defined by first and second reflective devices, the laser cavity comprising a cladding pumped optical fiber lasing medium coupled between the first and second reflective devices;
    a multi-mode pump source; and
    a combiner having at least first, second and third ports, wherein an output of the multi-mode pump source is operatively coupled to the first port of the combiner, and the combiner is coupled at its second and third ports within the laser cavity;
    the combiner comprising a tapered fiber bundle and being configured to couple pump light from the multi-mode pump source into the laser cavity utilizing mode-based coupling without the use of wavelength-based coupling.

2. The optical fiber laser as recited in claim 1, wherein the cladding pumped fiber includes a rare earth doped core.

3. The optical fiber laser as recited in claim 1, wherein at least one of the first and second reflective devices comprises a fiber Bragg grating.

4. The optical fiber laser as recited in claim 3, wherein the fiber Bragg grating has a high index coating formed thereon.

5. The optical fiber laser as recited in claim 1, wherein the first and second reflective devices comprise at least one of a dielectric film mirror, an interference filter, a broad metal mirror, and a polished fiber end.

6. The optical fiber laser as recited in claim 1, wherein the lasing medium comprises a single-mode fiber.

7. The optical fiber laser as recited in claim 1, wherein the optical fiber laser is configured for bidirectional pumping of the laser cavity.

8. A method for combining laser light with pump light in an optical fiber laser device having a laser cavity defined by first and second reflective devices, the laser cavity comprising a cladding pumped optical fiber lasing medium coupled between the first and second reflective devices, the method comprising the steps of:

positioning a combiner within the laser cavity, the combiner having at least first, second and third ports, the combiner being positioned so as to be coupled at its second and third ports within the laser cavity; and coupling a multi-mode pump source for exciting the lasing medium to the first port of the combiner;

the combiner comprising a tapered fiber bundle and being configured to couple pump light from the multi-mode pump source into the laser cavity utilizing mode-based coupling without the use of wavelength-based coupling.

9. The method as recited in claim 8, wherein the cladding pumped fiber includes a rare earth doped core.

10. The method as recited in claim 8, wherein at least one of the first and second reflective devices has a low index coating formed thereon.

11. The method as recited in claim 8, wherein the lasing medium comprises a single-mode fiber.

* * * * *